United States Patent [19]

Lampenius et al.

[11] Patent Number: 4,776,957

[45] Date of Patent: * Oct. 11, 1988

[54] ROTATING ELEMENT FOR A SCREENING APPARATUS WITH A CONTOUR SURFACE

[75] Inventors: Harry Lampenius, Karhula, Finland; Frey Frejborg, Glens Falls, N.Y.

[73] Assignee: A. Ahlstrom Corporation, Noormarkku, Finland

[ * ] Notice: The portion of the term of this patent subsequent to Jun. 32, 2004 has been disclaimed.

[21] Appl. No.: 41,241

[22] Filed: Apr. 22, 1987

Related U.S. Application Data

[63] Continuation-in-part of Ser. No. 738,743, May 29, 1985, Pat. No. 4,676,903, which is a continuation-in-part of Ser. No. 472,742, Mar. 7, 1983, Pat. No. 4,529,520.

[30] Foreign Application Priority Data

Jan. 26, 1983 [FI] Finland ................................. 830256

[51] Int. Cl.$^4$ .......................... B01D 29/38; B07B 1/20
[52] U.S. Cl. ...................................... 210/413; 209/273
[58] Field of Search ............... 209/273, 300, 305, 306, 209/379, 397, 250; 210/413, 498; 162/55

[56] References Cited

U.S. PATENT DOCUMENTS 4,447,320  5/1984  Lamort .................................. 209/273

Primary Examiner—Ivars Cintins
Attorney, Agent, or Firm—Bucknam and Archer

[57] ABSTRACT

An apparatus for screening pulp comprises a vessel, a cylindrical screen within the vessel, a rotating element moving in the vicinity of the screen at a predetermined speed, an inlet for the unscreened pulp, an outlet for the screened pulp in the vessel. The rotating element has a contour surface, for instance grooves formed of a first bottom plane parallel to the envelope surface, an inclined plane, an upper plane and a side plane, the side plane being essentially perpendicular to the first bottom plane, the inclined plane forming an angle between 5 degrees-60 degrees with the first plane, the upper plane being parallel to the first plane. The rotating element may be a rotor or blade type segments. The rotor is located on the inlet side of the screen but the contour surface of the screen may be the outer or the inner surface of the screen drum. Also the screen has a contour surface which may have different configurations.

10 Claims, 7 Drawing Sheets

CONTOUR SURFACE ROTOR

CONVENTIONAL HYDROFOILS

PULSE PROFILE

CONTOUR SURFACE ROTOR

CONTOUR SURFACE ROTOR PULSE PROFILE

PULSE DUE TO FLUID FLOW OVER THE CONTOUR SURFACE OF SCREEN

CONTOUR SURFACE BLADES

FLUID FLOW DIRECTION

CONTOUR PROFILE

CONVENTIONAL HYDROFOIL $$I.F. = \frac{\Delta AMP}{\Delta t}$$

CONTOUR STYLE ROTOR

ROTATING ELEMENT FOR A SCREENING APPARATUS WITH A CONTOUR SURFACE

The present application is a Continuation-in-Part of U.S. Ser. No. 738,743 filed May 29, 1985, which is a Continuation-in-Part of U.S. Ser. No. 472,742 filed Mar. 7, 1983. The latter has now issued as U.S. Pat. No. 4,529,520 on July 16, 1985. The subject matter of U.S. Ser. Nos. 472,742 and 738,743 is incorporated herein by reference U.S. Ser. No. 738,743 has issued as U.S. Pat. No. 4,676,903.

The present invention relates to a screening apparatus which is intended primarily for screening and purification of pulp and more specifically paper pulp. This screening apparatus comprises a vessel, a cylindrical screen in the interior of the vessel, a rotor which moves in the vicinity of the screen surface, an inlet for the pulp to be screened, an outlet for the reject and another outlet for the screened pulp, which is called the accept.

In U.S. Pat. No. 4,529,520, a cylindrical screen plate is described which has an inlet on one side for introducing the unscreened pulp, and an outlet in the opposite side for removing the reject portion. Means are provided for moving the unscreened pulp along one first direction of flow. The screen plate has grooves in the side of the inlet recessed in the screen surface, the first direction of flow being essentially transverse to the grooves. The grooves are formed of an upstream side plane, a downstream side plane and a bottom plane. The bottom plane is essentially parallel to the envelope surface of the screen plate. The grooves have perforations in the bottom plane. The upstream side plane of the grooves, as seen standing from the bottom of the grooves, is substantially perpendicular to the envelope surface and the downstream side plane of the grooves forms an angle 60 degrees-5 degrees against the envelope surface. According to one embodiment, the angle between the downstream side plane of the grooves and the envelope surface of the screen plate is about 30 degrees. This configuration is called a "contour profile."

U.S. Ser. No. 738,743 defines a rotor intended to increase the intensity of the pulses generated near the openings, either orifices or slots within the screen plate, for the purpose of creating the negative pulses necessary to backwash the screen and to prevent plugging. The screen has an inlet side and an outlet side and the rotor is located on the inlet side of the screen. The rotor described in Ser. No. 738,743 has a contoured surface, with grooves formed of a first plane parallel to the envelope surface, an inclined plane, an upper plane and a side plane, the side plane is essentially perpendicular to the first plane, the inclined plane forming an angle between 30 degrees-60 degrees with the first plane, and the upper plane being parallel to said first plane. Also the screen cylinder has a contoured surface profile, with grooves.

In the paper making process, pulp is produced by cooking wood which separates the wood into fibers. Due to the different properties of the wood even from the same tree, some of the fibers do not separate and are dispersed as fiber bundles usually called debris, shives or slivers which form the reject. There are also other impurities, such as bark, which must be removed. The screen must separate the undesired impurities and debris called the rejects from the accept portion. In order to avoid substantial losses of fibers which could be carried over together with the debris in the reject portion, it is necessary to remove the impurities efficiently and selectively.

It should be stressed that different applications have different requirements. In some applications, it is necessary to achieve a high content of long fibers, especially secondary fibers, in the accepts because the long fibers give strength to the final product, for instance paper. In other applications, on the other hand, the contrary is true. For instance, in virgin or pulp mill fibers, it is desirable to concentrate the long fibers in the reject for reject refining.

A great deal of work has been carried out in connection with screen plates and rotors and it has been recognized that means to create pulsations on the rotor will increase the efficiency of the apparatus. U.S. Pat. Nos. 3,363,759 and 4,318,805 describe drum rotors with a bumped surface which provides pulsations. In U.S. Pat. No. 4,318,805, the bumps take the form of pins projecting from the rotor with enlarged heads, the heads providing the pulses while the pins offer little resistance to flow.

U.S. Pat. Nos. 4,447,320 and 4,200,537 describe rotors which carry blades or vanes moving in the vicinity of the screen which produce a positive pulse. Other patents describe other types of rotors, for instance U.S. Pat. No. 3,726,401 uses a rotor with bumps or protuberances which produce about equal positive and negative pulses. According to this patent, any form of bumps may be used provided it produces the desired pulses, the bumps and the depressions between them creating positive screening and negative screen cleaning pressure pulses.

U.S. Pat. No. 3,400,820 describes a rotary member made up of a plurality of separate segments joined together and forming a selective undulating pattern which produces about equal positive and negative pulses.

One object of the present invention is to provide a rotating element which increases the intensity of the pulses, both positive and negative pulses generated near the openings, either orifices or slots within the screen plate, for the purpose of creating the positive pulses to help force the longer fibers through the openings within the screen and the negative pulses which are necessary to backwash the screen, and to prevent plugging.

Another object is to provide a rotating element with very high frequency pulses in addition to sufficient amplitude.

Still another object is to provide a rotor which may be used successfully to screen a pulp of consistency 0.3-6%.

Still another object is to provide a rotating element which may be used in an apparatus in which the screen has an inlet side and outlet side and the rotor is located on the inlet side of the screen but the contour surface of the screen may be the outer or the inner surface of the screen drum.

Another object is to provide a rotating eloement which produces sharp and steep pulses, thus resulting in high intensity.

Still another object is to reduce the power requirements.

Another object is to provide a rotor which permits to operate with smaller orifices in the screen cylinder thus improving the screening efficiency.

Still another object is to obtain an accept portion of consistency as close as possible to the consistency of the pulp introduced at the inlet.

Another object is to provide blade type segments to be used instead of a rotor in certain applications in which the continuous surface of a rotor is not desirable, for instance when fractionation of the long fibers should be avoided and a larger inlet screening zone is preferable.

Still another object is to provide a rotor and blade type segments which may be used in conjunction with the screen plate described and claimed in U.S. Pat. No. 4,529,520, but is not limited to the screen plate of this patent.

It has now been found that a specific shape of the rotor surface and the blade type segments as described hereinbelow, is particularly advantageous in producing the higher intensity pulses and in creating sufficient negative pulses so that plugging of the screen is minimized.

The present invention will be illustrated in more detail by reference to the accompanying drawings of which:

Figure 6:
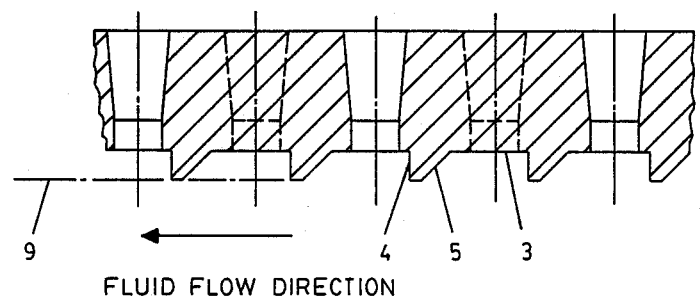

FIG. 6 shows the contour profile of the screen plate according to U.S. Pat. No. 4,529,520.

Figure 7:
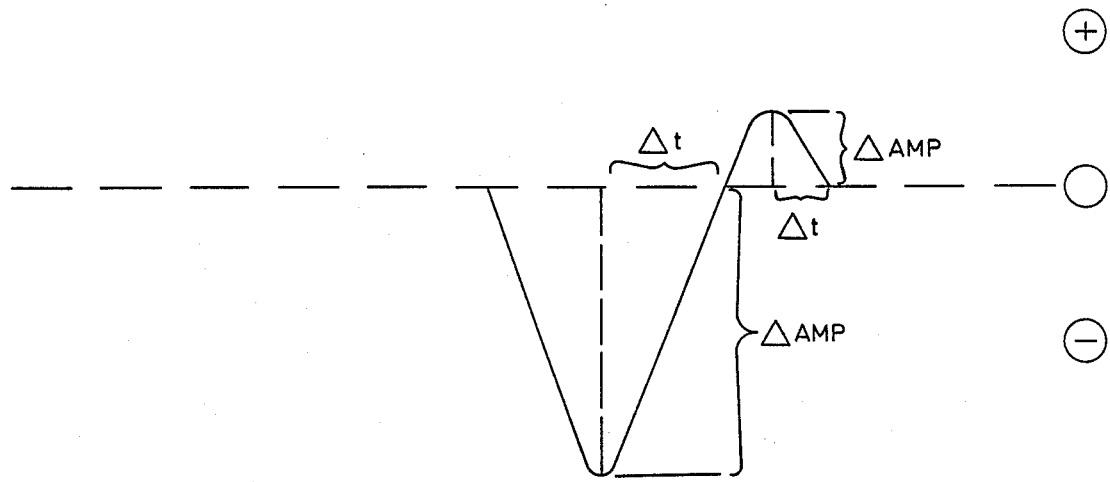

FIG. 7 illustrates the intensity factor which is the ratio of the change of amplitude over a unit of time with a conventional rotating element.

Figure 7A:
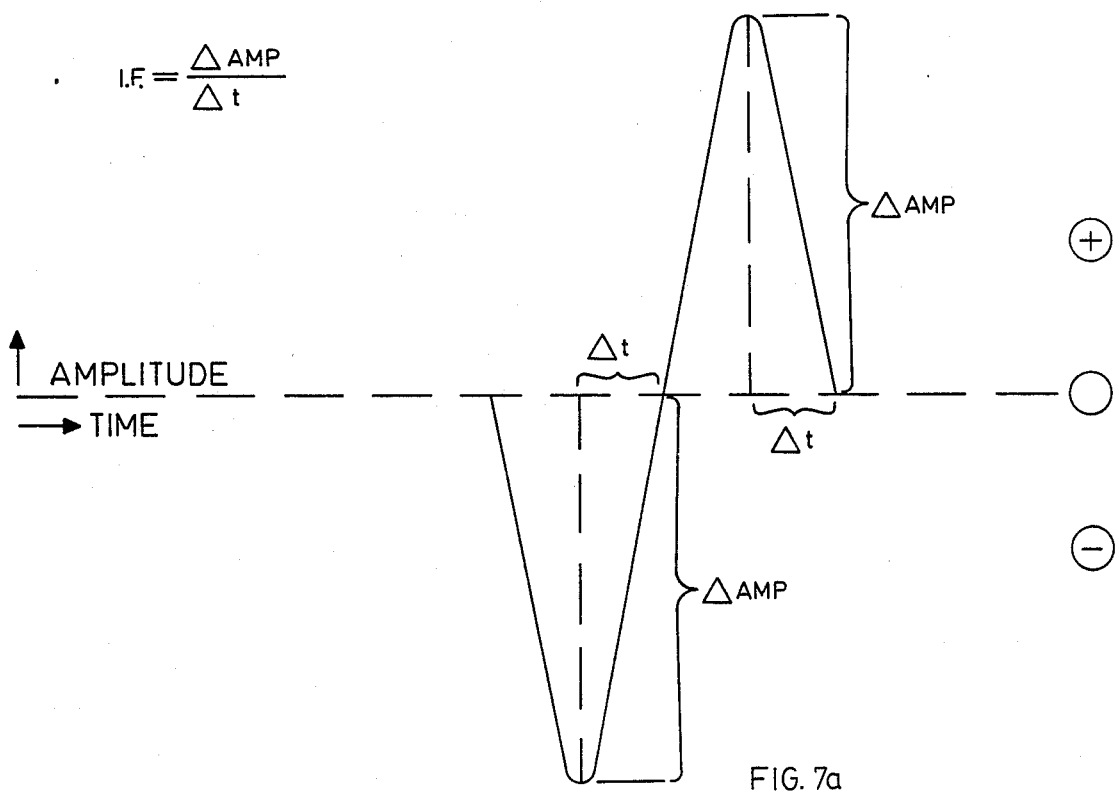

FIG. 7a illustrates the intensity factor for a rotating element according to the present invention for both negative and positive pulses produced.

Figure 8:
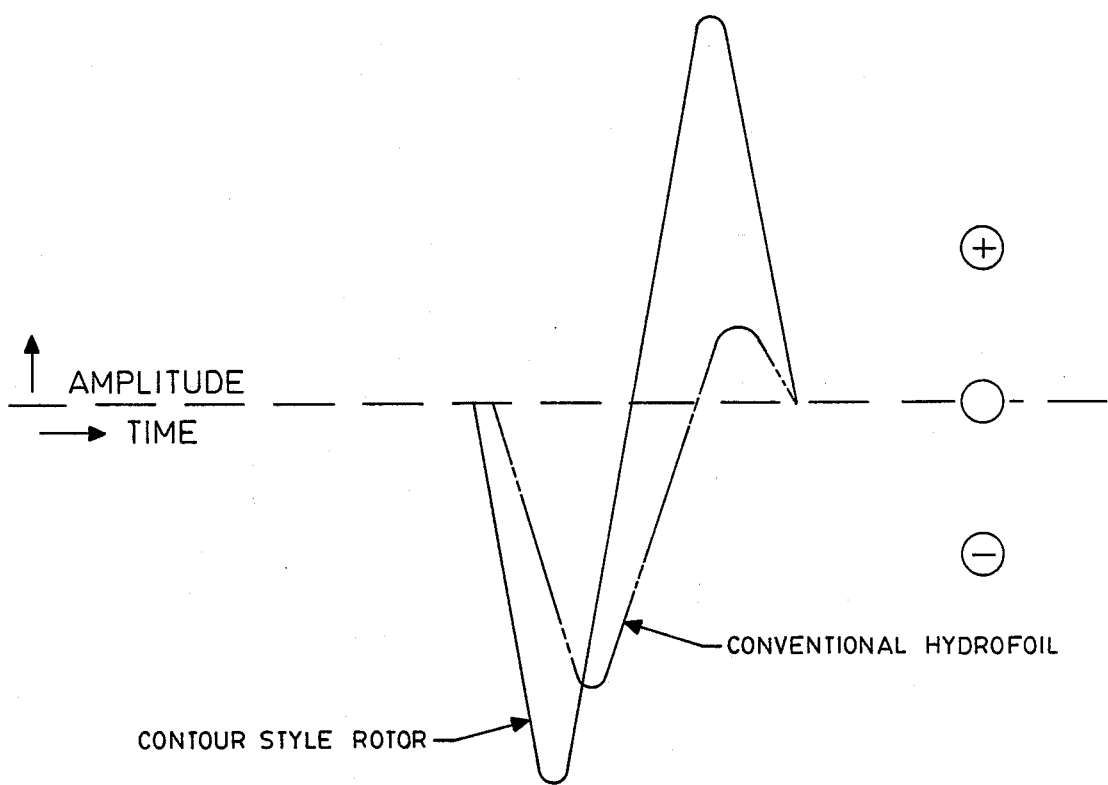

FIG. 8 is a comparison of the pulse profile of conventional rotors and the rotor according to the present invention.

Figure 9:
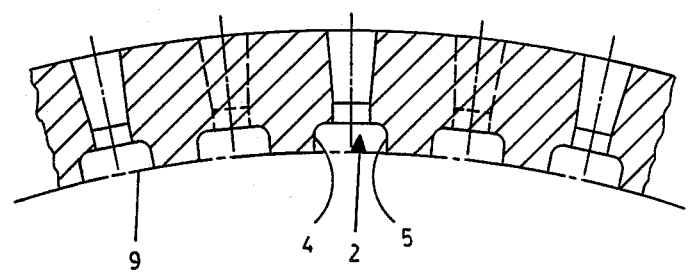
Figure 10:
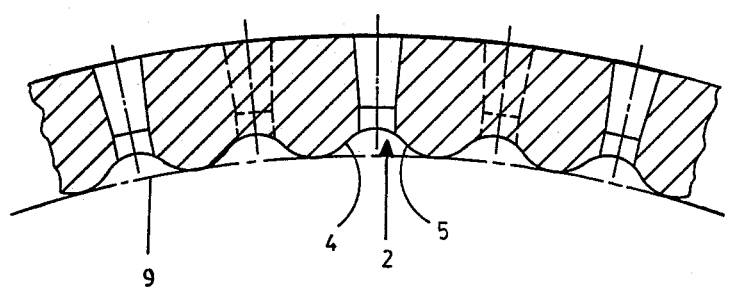

FIGS. 9 and 10 illustrate other screens having a contour surface which may be used in conjunction with the rotor of the present invention.

Figure 2:
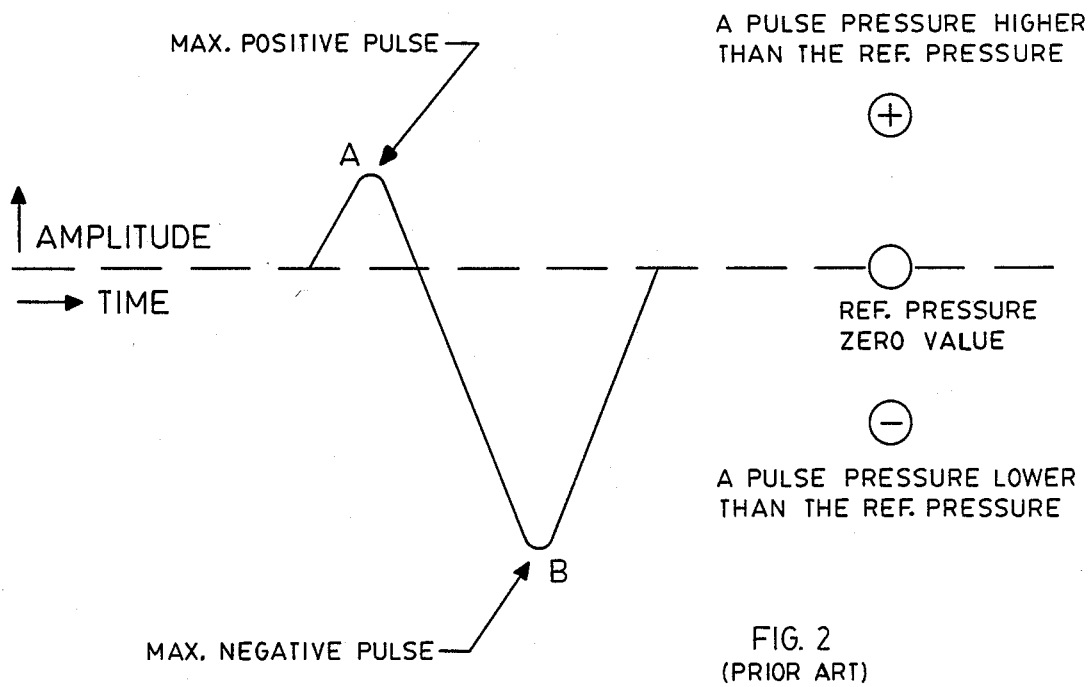
FIG. 2 illustrates the pulses which are produced by the rotating hydrofoil screens of FIG. 1.

As shown in FIG. 2, the rotating hydrofoils produce both negative and positive pulses. The symbol 0 pressure designates the value of the pressure near the screen surface of the screening zone between the rotating foil and the screen cylinder. When the pulp pressure is greater than the reference 0 point, the pressure has a positive value, which is at maximum at the point A and when it is less than the reference point, the pressure has a negative value, the latter being at a maximum at the point B.

Figure 1:
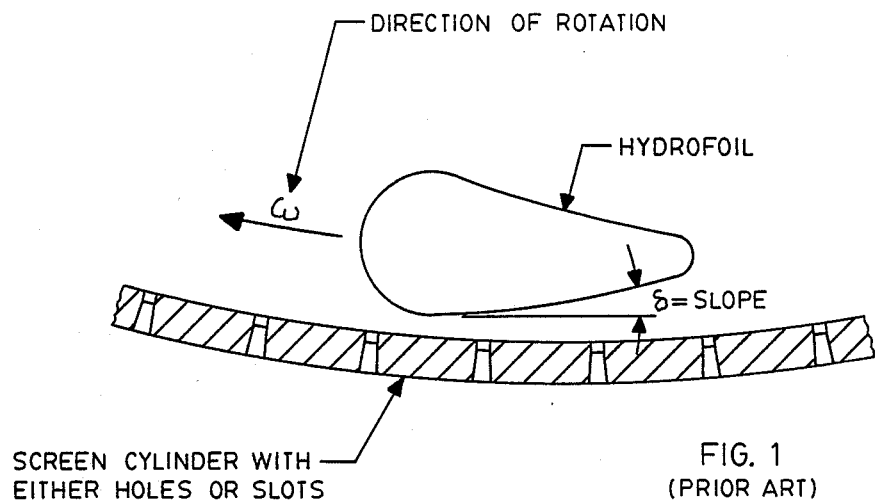
FIG. 1 illustrates a conventional pressure screen using hydrofoils for producing pulses.

The rotating hydrofoils of FIG. 1 known in the art produce pulses illustrated in FIG. 2. As shown in the figure, the leading surface or nose on the hydrofoil develops a positive pulse with the maximum value or amplitude just about at the minimum clearance point between the foil and the screen. The positive pulse contributes to induce the flow in the screening zone through the apertures within the screen because the flow will always be from a higher pressure zone to a lower pressure zone. However, after the minumum foil clearance point a maximum negative pulse is developed due to the change in slope of the foil blade from its minimum clearance position. As shown in FIG. 1, the angle of this slope for most foil blades would be a maximum of approximately 30 degrees or even less. After the maximum negative pulse point the pressure increases again up to the reference 0 point. The negative pulses induced by the rotating hydrofoil cause a momentary reverse or back-flow through the apertures within the screen thus dislodging any build-up of fibers at the apertures. This self-induced backwashing is greater, the greater is the negative pulse.

The foils or lobe-shaped surfaces or protrusions of rotors and blade type segments known in the art have leading surfaces curved towards the screen cylinder until the minimum rotor clearance point is reached, followed by a trailing surface curving away from the screen. At the minimum rotor clearance point, the change in slope of the curved surface is 0. Shortly after this point, the magnitude of the negative pulses starts to increase to a maximum negative value after which the pulses start decreasing again, thus repeating the cycle, as shown in FIG. 2.

The crux of the present invention resides in providing a rotor and blade type segments with grooves, the grooves having a contour surface being formed of a first bottom plane parallel to the envelope surface, an inclined plane which is the upstream side plane, an upper plane and a side plane, which is the downstream side plane, the side plane being substantially perpendicular to the first plane and the inclined plane of the grooves forming a 5 degree-60 degree angle against the first plane, the upper plane being parallel to the first plane. According to a preferred embodiment this angle is about 15 degrees.

According to one embodiment, the direction of the grooves may be different from the axial direction.

Figure 3:
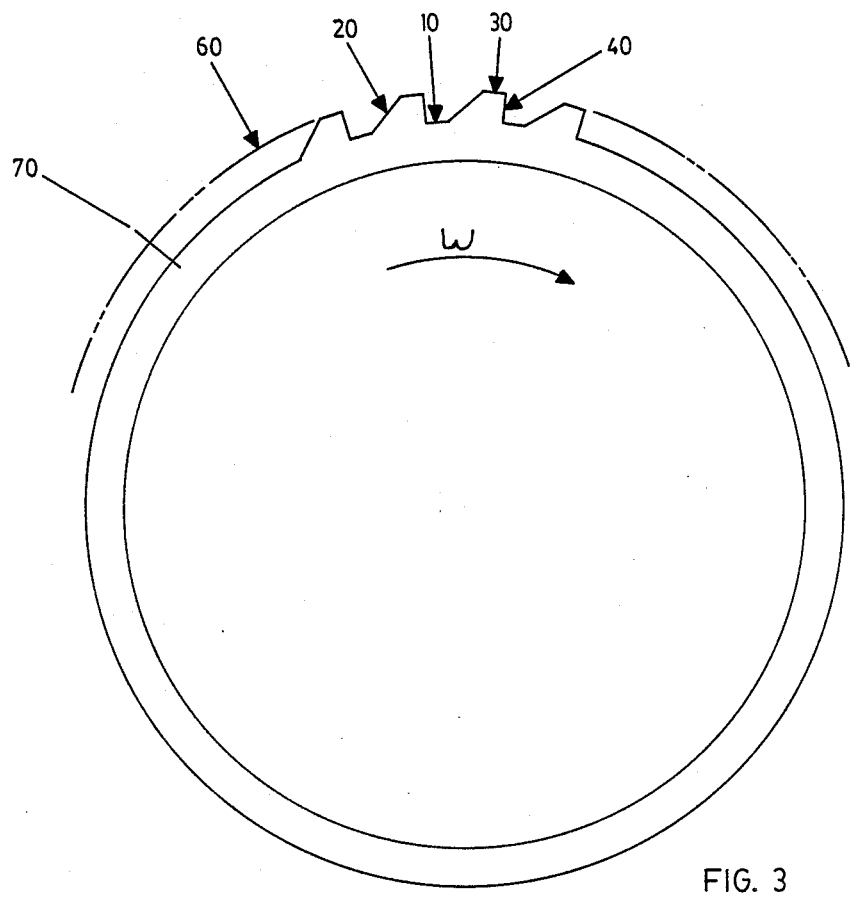
FIG. 3 and 3a illustrate the contour surface of one embodiment of the rotor in accordance with the present invention.
Figure 3A:
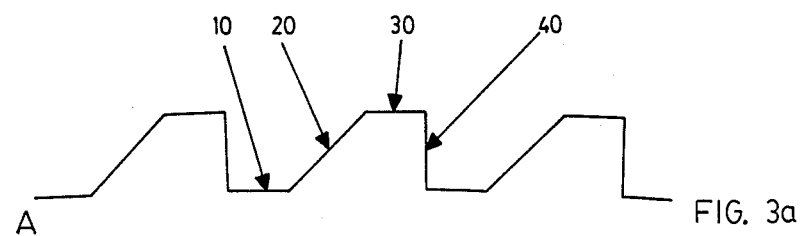

By reference to FIGS. 3 and 3a, numeral 10 designates the first bottom plane and numeral 20 designates the inclined plane. Numeral 30 designates the upper plane and numeral 40 designates the side plane perpendicular to the first plane.

Figure 5:
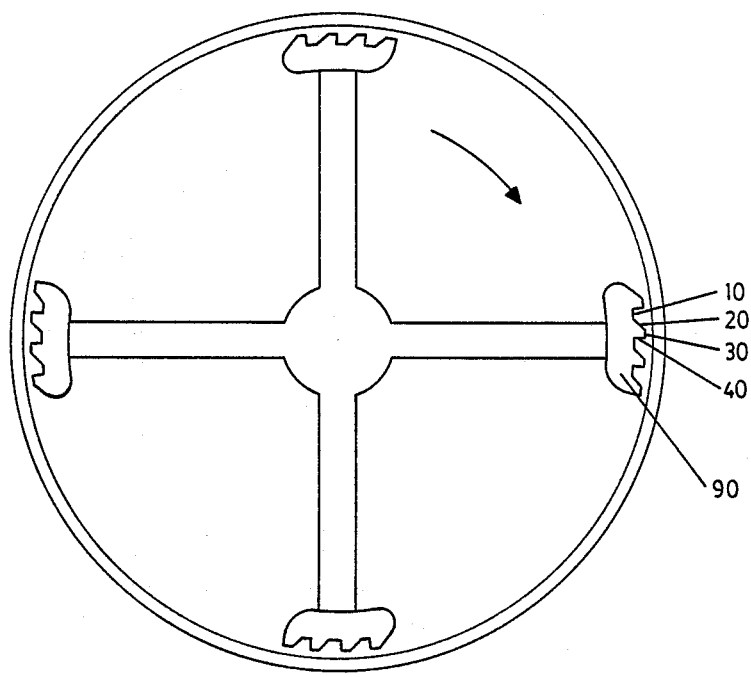
FIG. 5 illustrates the embodiment of the blade type segments instead of a rotor, with a contour surface according to the present invention.

By reference to FIG. 5, the same numerals 10, 20, 30, 40 are used to designate the first bottom plane, the inclined plane, the upper plane and the side plane which is perpendicular to the first plane.

As shown in FIG. 3a, starting from reference point A, the leading contoured surface has a first plane 10 parallel to the envelope surface. It then intersects side plane 40 forming essentially a right angle which produces the high intensity positive pulses which help force the long type fibers and liquid through the screen. The side plane continues until it intersects the upper plane 30 again forming essentially another right angle. Upper plane 30 continues parallel to the envelope surface, then slopes forming an inclined plane 20 until it reaches bottom plane 10 at the starting point A. The first bottom plane 10 may vary from a length of ¼" to 3". After the bottom first the groove comprises a side plane 40 perpendicular to the first plane 10. The length of the upper plane 30 should be between ¼" and 3". After the upper plane, the groove comprises an inclined plane 20 which is sloped approximately 5 degrees-60 degrees from the upper plane.

This feature of the side plane 40 being substantially perpendicular to the bottom plane is essential in order to produce higher intensity positive pulses which are more effective in forcing the longer type fibers through the screen as compared with rotors which have a curved surface.

Figure 4:
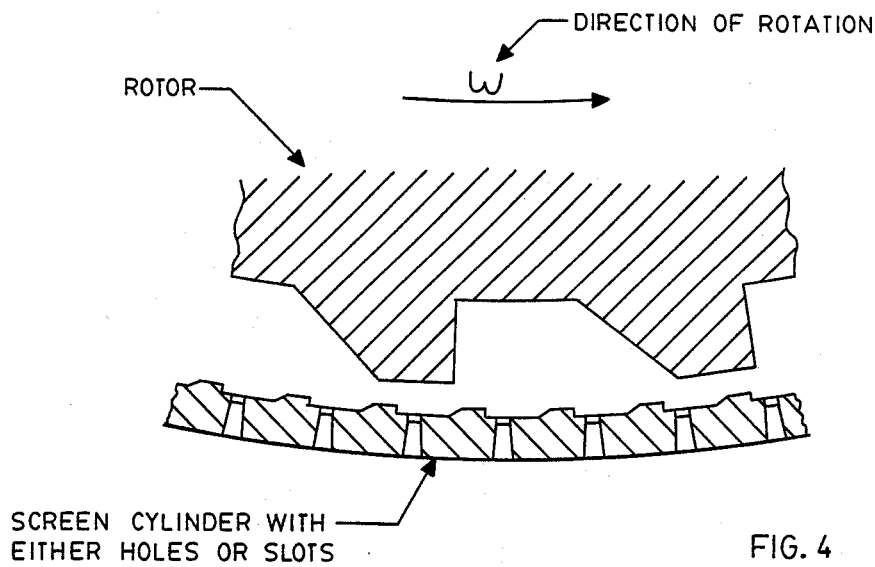
FIGS. 4 and 4a illustrate the nature of the pulses which are produced from a rotor or from the blade type segments with a contour surface according to the present invention, as shown in FIGS. 3 and 5.
Figure 4A:
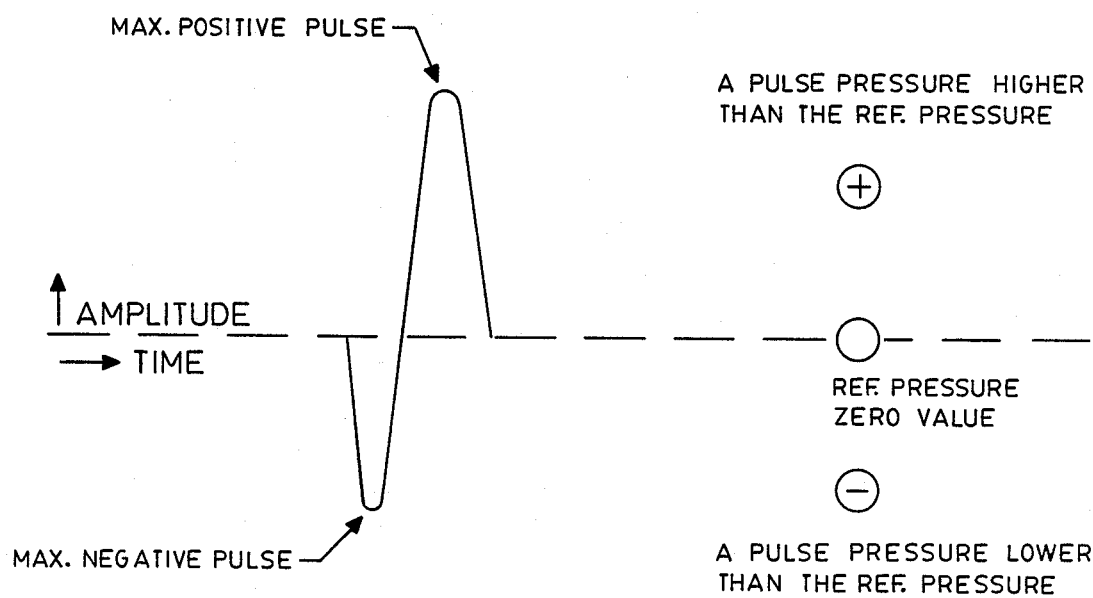

FIG. 4a illustrates the pulses from a rotating element having the contour profile according to the present invention. As shown a large positive pulse is produced by the 90 degree angle in the rotor surface or in the blade type segment. This is due to the rapid displacement of the fluid as the surface moves through the liquid acting like a pumping member. These positive pulses not only force more of the longer type fibers through the screen, but also reduce the effective pressure drop across the screen, thus increasing its overall capacity.

After the positive pulse, a high intensity negative pulse, as shown in FIG. 4a, is produced by the diverging slope of the inclined contour surface away from the top plane surface. The reason a negative pulse is generated at this point is the fact that the velocity of the fluid within the screening zone is first increased to a maximum at the minimum rotor or blade type segment clearance point and then the fluid tries to expand due to the increasing clearance of the rotor surface at the inclined slope of the rotor. Large negative pulses are necessary to backwash the screen, and to prevent plugging, thus increasing the flow of the fiber suspension through the openings of the screen.

The term "intensity of the pulses" within the scope of the present invention is intended to mean the change of amplitude of the pulses per unit time. To state the matter in different words, the intensity is not merely the result of the amplitude but also depends on the fast and sharp change. The intensity factor, IF, is the ratio of the change of amplitude over the unit of time: amplitude/time (FIGS. 7 and 7a).

FIG. 4a when compared with FIG. 2 shows the superiority of the rotating element of the present invention with the contour surface with respect to conventional rotors or conventional blade type elements. Further, the sharp right angle formed by the side plane leading surfaces of the contour rotating elements produce large high intensity positive pulses which help force more of the fibrous suspension through the apertures within the screen.

FIG. 5 illustrates the embodiment in which a large screening zone with a substantial open area is desirable to allow inlet stock to enter the full screening zone, thus minimizing the concentration of the long fibers in the reject and minimizng the consistency of the reject, so that more long fibers are in the accept. In this embodiment, instead of a rotor, blade type segments are used with a contour surface.

The contour surface of the rotating element, a rotor or blade type segments according to the present invention, provides high frequency pulsations. For instance, with a rotating speed of 600 RPM, it is possible to achieve a pulsation frequency of 200 Hz and even higher. The high frequency is advantageous because there is less tendency for the fibers to plug the openings and due to the fact that the pulses also exhibit sufficient amplitude, back-flushing occurs. The higher frequency permits the screen to handle stock of higher concentration.

Comparison of FIGS. 7 and 7a shows the superiority in intensity factor achieved by the rotating element according to the present invention as compared with a conventional rotating element. In FIG. 8 the pulse profile of a conventional hydrofoil is shown in broken line and the pulse profile of a rotor with a contour surface according to the present invention is shown in solid line.

Other advantages of the rotor and blade type segments according to the present invention are that it is possible to reduce substantially the size of the apertures of the screen without any appreciable increase in power consumption, nor with any substantial loss in long fibers and with good yield of the accept portion. The consistency of the accept may be kept essentially the same as the consistency of the stock at the inlet.

The rotor as shown in FIG. 3 and the blade type segment shown in FIG. 5 may be used with conventional screen plates and also in conjunction with the screen plate having a contour profile according to U.S. Pat. No. 4,529,520 as shown in FIG. 6. However, it may also advantageously be used in conjunction with other screens as shown in FIGS. 9 and 10.

In the embodiments of FIG. 6 the groove is formed of a bottom plane 3 which is substantially parallel with the envelope surface 9 of the screen surface, an upstream side plane 4 and a downstream side plane 5. The angle between the envelope surface of the screen surface and the upstream side plane 4, or in other words between the plane tangenting the envelope surface of the screen surface close to this side plane and this side plane is approximately 90 degrees and the angle between envelope surface of the screen surface and the downstream side plane 5 is 5 degrees-60 degrees. The perforations of the screen plate are disposed on the bottom planes 3 of the grooves.

In the embodiment illustrated in FIG. 9, the grooves are U-shaped, and both side planes 4 and 5 are substantially perpendicular to the envelope surface 9 of the screen surface.

In the embodiment of FIG. 10, the screen surface is undulant and both sides 4 and 5 of the grooves are inclined with regard to the envelope surface 9 of the screen surface.

What is claimed is:

1. In an apparatus for screening pulp which comprises a vessel, a cylindrical screen within the vessel, the screen having an envelope surface and grooves, a rotating element moving in the vicinity of the screen at a predetermined speed, an inlet for the unscreened pulp, a first outlet for the accept screened pulp in said vessel, and a second outlet for the reject, said first and second outlets being in operative communication with said screen, the improvement which comprises said rotating element having a contour surface with grooves formed of a first bottom plane parallel to the envelope surface, an upstream inclined plane, an upper plane and a downstream side plane, said side plane being essentially perpendicular to said first bottom plane, said inclined plane forming an angle between 5 and 60 degrees with said first plane, said upper plane being parallel to said first plane.

2. The apparatus according to claim 1 wherein said rotating element is a rotor.

3. The apparatus according to claim 2, wherein said screen has an inlet side and an outlet side and said rotor is located on the inlet side of said screen.

4. The apparatus according to claim 2 wherein the contour surface of the screen is the outer or the inner surface and said contour surface of the screen faces the rotor.

5. The apparatus according to claim 1 wherein said rotating element consists of blade type segments.

6. The apparatus according to claim 1 wherein the screen is a cylindrical screen plate having grooves, the perforations are at the bottom of the grooves, the bottom plane of the grooves is parallel to the envelope surface, the grooves have two side planes and an upper plane, one side plane of the grooves is substantially perpendicular to the envelope surface of the screen surface and the other side plane is inclined with regard to said envelope surface.

7. The apparatus according to claim 6 wherein the screen is a cylindrical screen plate, said screen plate having grooves in the side of the inlet recessed in the screen surface, the screen plate having an envelope surface, the grooves being formed of an upstream side plane, as seen standing from the bottom of the grooves, a downstream side plane and a bottom plane, said bottom plane being substantially parallel to the envelope surface of the screen plate, the grooves having perforations in the bottom plane, the upstream side plane of the grooves being substantially perpendicular to said envelope surface and the downstream side plane of the grooves forming a 60 degree-5 degree angle against said envelope surface.

8. The apparatus according to claim 7 wherein in said screen plate the downstream side plane and the upstream side plane of the grooves are connected to each other by means of a plane substantially parallel to said envelope surface.

9. The apparatus according to claim 1 wherein both side planes of the grooves of the screen are substantially perpendicular to the envelope surface of the screen plate.

10. The apparatus according to claim 1 wherein both sides of the grooves of the screen form an undulant surface and both sides of the grooves are inclined with respect to the envelope surface of the screen.

* * * * *